United States Patent Office 2,848,481
Patented Aug. 19, 1958

2,848,481

NEW GUANIDINE COMPOUNDS, THEIR PREPARATION AND USE AS REAGENTS FOR PICRIC ACID

Alberto Vercellone and Claudio Pasini, Milan, Italy, assignors to Società Farmaceutici Italia, a corporation of Italy No Drawing. Application November 22, 1954
Serial No. 470,539

Claims priority, application Italy November 21, 1953

6 Claims. (Cl. 260—501)

The present invention relates to a new class of chemical compounds, represented by the formula

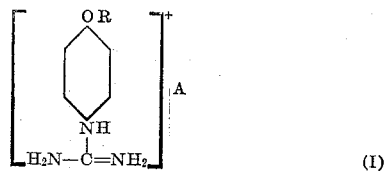

where R is an alkyl radical having more than four carbon atoms, and A⁻ is a radical of an acid, such as, for example, carbonic acid, hydro-halogenic acids, nitric, sulfuric or tartaric acid; but excluding highly oxidizing acids, such as chromic, permanganic, perchloric acid, etc.

Due to some of their properties, these compounds may be classified as cationic detergents. They belong to the series of p-guanidinophenol alkyl ether salts, of which only p-methoxy-phenylguanidinium nitrate (which is outside the scope of this invention) has been known.

It is the object of the present invention to produce compounds of the foregoing general formula, to provide a method for the preparation of these compounds, and to furnish, by means of these compounds, new and efficient reagents for picric acid. These and other objects are set forth in the herein following detailed description and in the appended claims.

Compounds according to the above formula are prepared by reacting p-aminophenol ethers with cyanamide, starting from an ionized salt, according to the scheme:

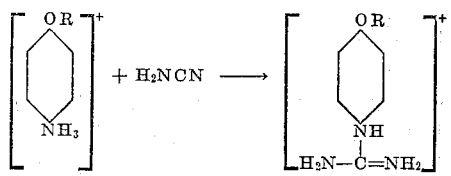

and performing the reaction with cyanamide in solvent solution while heating or simply preparing a melt of the reagents. The salt may be any of the possible amine salts and the ethers are alkyl ethers as indicated.

p-Aminophenol ethers are obtained according to well-known methods by reducing their nitro-derivatives with Sn, HCl or SnCl₂, or by means of a catalytic reduction. The nitro-derivatives

are generally prepared by reacting potassium p-nitrophenate with an alkyl halide.

The preferred way of isolating and purifying the compounds of this invention is to obtain the carbonates by treating an aqueous solution of the reaction product with alkaline carbonates or bicarbonates. In contrast to guanidine carbonate, for example, the carbonates of these compounds are little soluble in water and their separation is easy. Moreover, it is very simple to prepare therefrom aqueous solutions of salts of acids stronger than carbonic acid, such as the salts of hydro-halogenic, nitric, sulfuric, tartaric acids, etc. Solutions of these salts represent the preferred form of application of these compounds as reagents for picric acid; in addition, the pure salts may be readily obtained upon simple evaporation.

It has been found as one of the outstanding characteristics of the compounds of this invention that they produce picrates of extremely low aqueous solubility; for example, the picrate in which R is a dodecyl (lauryl) radical has a solubility lower than 1 p. p. m. The solubility of such picrates is further decreased in the presence of an excess of the compound over the picric acid present. Moreover, these picrates maintain their insolubility within a pH range of 2.5 to 9.0.

In addition, we found that the solubility of picric acid compounds of the type in question decreases with an increase in the chain length of the alkyl radical R. This is shown in the accompanying table prepared from a graph in which the values of log 1/S (S signifying the saturation concentration in moles per liter) and the number of carbon atoms in R were plotted at the abscissa and ordinate, respectively, similar to the equation pH=log 1/H. Inasmuch as both anion and cation are monovalent, S in this case equals √solubility product.

TABLE 1

| R (n) | Saturation concentration=S | | log 1/S, moles/liter |
|---|---|---|---|
| | g./liter | moles/liter | |
| methyl | 0.3210 | 8.14·10⁻⁴ | 3.089 |
| ethyl | 0.2790 | 6.83·10⁻⁴ | 3.165 |
| propyl | 0.1800 | 4.26·10⁻⁴ | 3.370 |
| butyl | 0.1220 | 2.80·10⁻⁴ | 3.553 |
| isoamyl | 0.0359 | 7.97·10⁻⁵ | 4.098 |
| octyl | 0.0062 | 1.26·10⁻⁶ | 5.900 |
| dodecyl | 0.0001 | 1.82·10⁻⁷ | 6.739 |

As can be seen, the experimental data check very closely with the following equation for solubility variations:

$$\log \frac{1}{S} = 0.027 n^2 + 3.1$$

From the equation it can be anticipated that a direct calculation of the S value for compounds in which R contains sixteen or more carbons is practically impossible. This agrees with our actual experience.

The presence of branched chains in R causes a further decrease of S, as indicated by the relative value of log 1/S found for the compound in which R is an isoamyl radical.

Because of the afore-mentioned, entirely unexpected properties of the compounds of this invention, they represent new and greatly superior reagents, particularly for picric acid. As such they are extremely valuable because, although picric acid has numerous uses, both in research work and chemical production, there has been, as yet, no quick and simple method for the quantitative determination thereof. By means of these compounds, the quantitative determination of picric acid is very rapid and accurate; after forming the picrate of one of the compounds of this invention, it is simply collected, dried and weighed.

For example, picric acid is very widely used in the isolation and purification of organic compounds having basic groups, because such organic picrates are often well crystallized and are not excessively soluble compounds.

In the case of a picrate-organic base compound of which the percent composition is known but not the constitutional formula of the base, compounds of this invention permit a direct determination of the picric acid content and, if the picrate in question is pure, an immediate determination of the empirical formula, or at least the minimum empirical formula, of the unknown base. Knowledge of the empirical formula, in turn, is of the utmost importance in the search for the chemical constitution of the base.

Finally, it is to be pointed out that compounds of the present invention offer the possibility of converting picrates of basic organic compounds into salts other than picric acid salts, particularly into mineral acid salts. The conversion is simple, results in high yields, and has the particular advantage of avoiding treatment with acid or alkalies of high concentration.

In carrying out the conversion of an organic picrate into, say, the corresponding hydrochloride, the picrate is customarily treated, while heating if necessary, with hydrochloric acid of fairly high concentration, followed by an extraction of the picric acid with a solvent (an operation which never goes to completion), and evaporation of the acidic solution. In the alternative, the picrate can be dissolved in alkaline solution and the base extracted either with solvents or by steam distillation (a procedure which has only limited applicability). However, it was impossible until now to treat the picrates of basic compounds in this manner, because they are affected in both the acid and alkaline medium.

According to this invention, the conversion of picrates of such basic compounds can be carried out by simply treating the picrate in hot aqueous solution with the stoichiometric amount of the hydrochloride of a compound according to this disclosure, allowing the liquid to cool and filtering off the precipitate. By evaporating the liquid, the hydrochloride of the base is obtained which, if desired, may be recrystallized. The yields are very close to the theoretical values.

The limitations imposed upon the use of the compounds of this invention as reagents for picric acid are about identical with those of any other precipitating reagent, namely:

(1) The picrate to be treated should have at least some water-solubility. In practice, it is sufficient that it imparts a yellow coloration to the liquid.

(2) The constituent which is liberated during the treatment should be water-soluble and should not affect the precipitate either chemically (for example, converting the picric acid) or as a peptizing agent (preventing the separation of the precipitate by filtration).

*Example 1*

A compound of Formula I is used as reagent, in which R=octyl and $A^-=\frac{1}{2}CO_3^{--}$.

PREPARATION OF THE REAGENT 0.2944 g. of the above-mentioned compound are introduced into a 100 cc. calibrated flask together with 11 cc. of N/10 HCl and 10–15 cc. of distilled water. The flask is heated on the water bath until the material is completely dissolved. Thereupon the solution is diluted with distilled water to nearly the mark.

The solution is left to cool and is then adjusted to the mark. It represents an N/100 solution of the compound

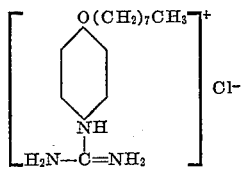

and is slightly acid because of an excess of HCl.

DETERMINATION OF PICRIC ACID

After heating a picric acid solution to 40–70° C. in an Erlenmeyer flask, the reagent is gradually added while stirring and the whole is left to cool. A precipitate forms which, after a few hours, is filtered off by means of, say, a small funnel having a porous filter bed. The flask is washed repeatedly with distilled water which is also passed through the filter. However, a certain amount of precipitate almost always adheres to the inside of the flask. Therefore, the latter as well as the funnel with the precipitate are dried for one hour in an oven at 105° C., after which the precipitate is flushed with distilled acetone, in which the precipitate residues adhering to the inside of the flask were dissolved previously. The acetone solution is collected in any suitable manner, say, in an evaporating dish, filter weighing bottle, etc., the weight of which has been previously calibrated. After the acetone has been evaporated at 50–60° C., the residue is dried to constant weight; 1 part of precipitate equals 0.465 part of picric acid.

RESULTS OBTAINED

Theoretical: 5 cc. of N/100 picric acid solution diluted with 140 cc. distilled water produce an about N/3000 solution containing 11.45 mg. of picric acid and 24.62 mg. of precipitate after adding the reagent.

Experimental:

TABLE 2

| Number of tests | Reagent, cc. | Reagent excess, percent | pH of filtrate | Average yield | Average error, percent | Average deviation, percent |
|---|---|---|---|---|---|---|
| 12 | 5.5 | 10 | about 3.5 | 24.32 | −1.22 | ±0.48 |
| 12 | 10.0 | 100 | ---do--- | 24.51 | −0.45 | ±0.44 |
| 12 | 15.0 | 200 | ---do--- | 24.66 | +0.16 | ±0.465 |
| 12 | 25.0 | 400 | ---do--- | 24.66 | +0.16 | ±0.365 |

As indicated by the above results, a large excess of the reagent tends to reduce the solubility of the precipitate.

PRECIPITATION TESTS OF THE REAGENT BY MEANS OF PICRIC ACID, AT VARIOUS pH 140 cc. of distilled water plus 5 cc. of the reagent are precipitated with 5.5 cc. N/100 sodium picrate (pH 6.32); pH variations are obtained by adding, prior to the tests, small amounts of HCl or NaOH to the distilled water.

TABLE 3

| Number of tests | pH of reagent | pH of water | final pH | Average | Average error, percent | Average deviation, percent |
|---|---|---|---|---|---|---|
| 11 | 3.6 | 2.52 | 2.5–2.8 | 24.245 | −1.51 | ±0.56 |
| 12 | 4.8 | 5.02 | 5.9–6.5 | 24.32 | −1.21 | ±0.54 |
| 11 | 4.12–4.8 | 7.1–7.46 | 6.6–7.4 | 24.31 | −1.26 | ±0.87 |
| 11 | 3.3 | 10.5 | 8.7–9.2 | 24.37 | −1.02 | ±0.64 |

As can be seen, the average errors and deviations are about the same as those of the first series of determinations. The results agree particularly well with that group of tests of the first series (Table 2) in which there is no great excess of reagent to cause a complete precipitation. Table 3 shows, furthermore, that the precipitate forms within a pH range of at least 2.5 to 9.2.

*Example 2*

DETERMINATION OF PICRIC ACID CONTENT IN ORGANIC PICRATES (a) *Murexine dipicrate.*—21.2 mg. and 20.9 mg. of murexine dipicrate are dissolved separately, each in 100 cc. of hot distilled water, and 12 cc. of the reagent described in Example 1 are added to each of the solutions. 30.5 and 30.1 mg., respectively, of precipitate are obtained.

Picric acid percent: calculated, 67.23%; found, 66.94%, 67.01%.

(b) *Hercynine dipicrates.*—15.0 mg. and 10.8 mg. of hercynine dipicrate are dissolved, each in 50 cc. of distilled water, and are precipitated with 10 and 7 cc., respectively, of the reagent. 22.4 and 16.1 mg. of precipitate are obtained.

Picric acid percent: calculated, 69.91%; found, 69.47%, 69.36%.

(c) *Choline picrate.*—33.4 mg. and 33.6 mg. of choline dipicrate are dissolved, each in 100 cc. of distilled water, and are precipitated, each with 20 cc. of the reagent. 49.0 and 49.4 mg. of precipitate are obtained.

Picric acid percent: calculated, 68.95%; found, 68.26%, 68.41%.

(d) *Glycine (glycocoll) picrate.*—31.4 mg. and 30.0 mg. of glycine picrate are dissolved, each in 200 cc. of distilled water, and are precipitated, each with 20 cc. of the reagent. 50.33 and 48.13 mg., respectively, of precipitate are obtained.

Picric acid percent: calculated, 75.32%; found, 74.58%, 74.65%.

Example 3

CONVERSION OF ORGANIC PICRATES INTO THE CORRESPONDING MINERAL ACID SALTS OR THE CORRESPONDING FREE BASES (a) A compound of the Formula I is used as reagent in which R=dodecyl and $A^- = \frac{1}{2} CO_3^{--}$.

*Hercynine from picrate.*—0.393 g. of hercynine dipicrate and 0.420 g. of the reagent are pulverized and thoroughly mixed in a mortar; the mixture is introduced, gradually and under stirring, into 15 cc. of boiling distilled water. The sample is permitted to cool, and is filtered after a few hours. The filtrate is decolorized by passing it through a layer of 50 mg. of activated carbon and is then evaporated to dryness. 0.089 g. of anhydrous hercynine (histidine-betaine) are obtained, corresponding to a yield of 76%.

*Tyramine hydrochloride from picrate.*—0.366 g. of tyramine picrate and 0.350 g. of the reagent are pulverized and mixed in a mortar; the mixture is introduced, gradually and under stirring, into 15 cc. of boiling distilled water, to which 1 cc. of N/1 HCl has been added. The sample is allowed to cool and is filtered after a few hours. The filtrate, still slightly yellow, is passed through 30 mg. of activated carbon, whereby it is completely decolorized and is then evaporated to dryness. The residue is taken up with absolute alcohol and the resulting solution is precipitated with ether. 0.153 g. of tyramine hydrochloride are obtained, corresponding to a yield of 88%.

(b) A compound of the Formula I is used as reagent, in which R=dodecyl and $A^- = Cl^-$.

*Murexine chloride hydrochloride from dipicrate.*—3.40 g. of murexine dipicrate and 3.56 g. of the reagent are mixed and pulverized in a mortar. The mixture is introduced, gradually and under stirring, into 100 cc. of boiling distilled water, to which 1 cc. of N/1 HCl is added. Proceeding as in the preceding example, 1.40 g. of murexine chloride hydrochloride are obtained, corresponding to a yield of 92%.

(c) A compound of the Formula I is used as reagent, in which R=octyl and $A^- = \frac{1}{2} CO_3^-$.

*Glycine (glycocoll) from picrate.*—1.52 g. of glycine (glycocoll) picrate and 1.47 g. of the reagent are treated in the manner set forth in the preceding example, but without addition of acid. After decolorization and evaporation of the liquid, 0.370 g. of glycine (glycocoll) are obtained, corresponding to a yield of 99%.

*Choline sulfate from picrate.*—6.64 g. of choline picrate are dissolved in 10 cc. of boiling water, to which 20 cc. of N/1 $H_2SO_4$ have been added. Then 5.9 g. of the reagent are gradually added. The sample is boiled for another fifteen minutes and is filtered after cooling. The slightly yellow filtrate is concentrated to 30 cc. and passed through a layer of decolorizing carbon. The liquid is evaporated, first at 14 mm. Hg and then under the vacuum of an oil pump; the residue is taken up with absolute alcohol and the resulting solution is precipitated with petroleum ether. 2.92 g. of chlorine sulfate are obtained corresponding to a yield of 96%.

Example 4

PROCEDURE FOR THE PREPARATION OF THE REAGENTS OF THIS INVENTION (a) *p - Guanidinophenyl - isoamyl ether carbonate* (R=isoamyl, $A^- = \frac{1}{2} CO_3^{--}$).—10 g. of p-aminophenyl-isoamyl ether hydrochloride are refluxed for one to three hours with 3.5 g. of cyanamide in 30 cc. of ethyl acetate. After removal of the solvent, the residue is taken up with 100 cc. of hot water and the resulting solution is boiled for fifteen minutes with decolorizing carbon and filtered. While stirring, the filtrate is added to a solution of 7 g. of sodium bicarbonate in 150–200 cc. of water. A white precipitate forms immediately, which is filtered, washed and recrystallized from aqueous alcohol, resulting in silky scales, melting at 142–147° C. with decomposition.

Generally, ethyl acetate may be replaced by any other inert solvent for p-aminophenol alkyl ether having a boiling point between 50 and 150° C.

(b) *p - Guanidinophenyl - isoamyl ether sulphate* (R=isoamyl, $A^- = \frac{1}{2} SO_4^{--}$).—2.52 g. of p-guanidino-phenyl-isoamyl ether carbonate are dissolved in 10 cc. of methyl alcohol and the solution is added to 50 cc. of N/5 sulfuric acid. The alcohol is driven off by boiling and the residue is allowed to cool. The white precipitate obtained consists of p-guanidinophenyl-isoamyl ether sulfate.

(c) *p - Aminophenyl - octyl ether hydrochloride* R=octyl, $A^- = Cl^-$).—25 g. of p-nitrophenyl-octyl ether are dissolved in 250 cc. of 99% alcohol and are hydrogenated at 50 atmospheres and at 80–90° C. with Raney nickel. The catalyst is removed by centrifugation and 9 cc. of concentrated HCl are added. The solution is concentrated in vacuo and p-aminophenyl-octyl ether hydrochloride is precipitated upon cautious addition of ether, resulting in small colorless scales, melting at 185° C. with decomposition.

(d) *p-Guanidinophenyl-octyl ether carbonate* (R=octyl, $A^- = CO_3^{--}$).—10 g. of p-aminophenyl-octyl ether hydrochloride are refluxed for three hours with 3 g. of cyanamide in 30 cc. of ethyl alcohol. Then the solvent is eliminated, the residue is taken up with 100 cc. of hot water and boiled for fifteen minutes, together with decolorizing carbon. The liquid is filtered and the filtrate is added while stirring to a solution of 8 g. of sodium bicarbonate in 300 cc. of water. The white precipitate is filtered off, washed and crystallized from methyl alcohol, resulting in silky scales, melting at 130–134° C. with decomposition.

(e) *p - Guanidinophenyl - octyl ether hydrochloride* (R=octyl, $A^- = Cl^-$).—2.95 g. of p-guanidinophenyl-octyl ether carbonate are gradually dissolved in 20 cc. of N/2 HCl at 90° C. After cooling and seeding, the hydrochloride is separated.

(f) *p - Guanidinophenyl - octyl ether nitrate* (R=octyl, $A^- = NO_3^-$).—2 g. of p-guanidinophenyl-octyl ether hydrochloride are dissolved in 50 cc. of boiling water and poured, while stirring, into 10 cc. of a 10% $NaNO_3$ solution. After cooling, the precipitate, consisting of p-guanidinophenyl-octyl ether nitrate, is filtered off.

(g) *p - Guanidinophenyl - lauryl (dodecyl) ether hydrochloride* (R=dodecyl, $A^- = Cl^-$).—10 g. of p-aminophenyl-lauryl ether hydrochloride are refluxed for two hours with 2.5 g. of cyanamide in 30 cc. of ethyl acetate. The liquid is boiled for several minutes together with decolorizing carbon and is then filtered. Upon cooling, the hydrochloride separates from the solution.

(h) *p - Guanidinophenyl - lauryl (dodecyl) ether carbonate* (R=dodecyl, $A^- = \frac{1}{2} CO_3^{--}$).—The mother liquor of the preceding preparation is evaporated; the residue is taken up with water and boiled for fifteen minutes together with decolorizing carbon; the solution is filtered and then a solution of 5–6 g. of sodium bicarbonate is added while stirring. The precipitate, filtered off and washed, is recrystallized from methanol, resulting in scales melting at 125–134° C. with decomposition.

(i) *p - Guanidinophenyl - dodecyl ether tartrate* (R=dodecyl, A⁻⁻=½(C₄H₄O₆)).—3.5 g. of p-guanidinophenyl-dodecyl ether carbonate are dissolved in 40 cc. of methyl alcohol. The solution is added to a solution of 0.75 g. of tartaric acid in 5 cc. of water. The liquid is evaporated to dryness on a boiling water bath. The residue is dissolved in methanol and the resulting solution is precipitated with acetone. p-Guanidinophenyl-dodecyl ether tartrate in the form of a white microcrystalline powder is obtained.

(j) *p-Nitrophenyl-hexadecyl ether* (R=hexadecyl).— 25 g. of potassium p-nitrophenate and 50 g. of cetyl bromide are mixed and heated for two hours in a large open test tube on an alloy bath, the temperature of which is 230–240° C., while stirring was a glass rod. The nearly black, waxy mass thus obtained is thoroughly mixed with sand and 20 g. of decolorizing carbon and is then extracted for ten to twelve hours in a Soxhlet with 600 cc. of methyl alcohol. The hot liquid is separated by decanting from the oil deposited at the bottom of the flask, and 150 cc. of hot methyl alcohol are added. Upon gradually cooling, p-nitrophenyl-hexadecyl ether is separated in the form of ivory-white granules, having an M. P. of 54–56° C. When extracting the oily residue with hot methyl alcohol, another fraction of the pure product is obtained; subsequent extractions will yield more of the product, but in smaller quantities and at lower purity.

(k) *p-Guanidinophenyl-hexadecyl ether hydrochloride* (R=hexadecyl, A⁻=Cl⁻).—5 g. of p-aminophenyl-hexadecyl ether hydrochloride are heated to boiling in 30 cc. of ethyl acetate; 20 cc. of a 17% cyanamide solution in ethyl acetate are added. The liquid is refluxed for three hours and allowed to cool. The white precipitate which is separated consists of practically pure p-guanidinophenyl-hexadecyl ether hydrochloride, having an M. P. of 107–110° C.

We claim:
1. As a reagent capable of quantitatively precipitating picric acid from aqueous solutions of picric acid and picric acid salts, the compound

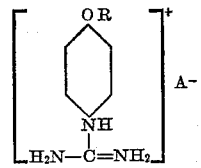

wherein R is an alkyl radical comprising at least five carbon atoms and A⁻ is the radical of an acid taken from the group consisting of carbonic, hydro-halogenic, nitric, sulfuric and tartaric acids.

2. As a reagent capable of quantitatively precipitating picric acid from aqueous solutions of picric acid and picric acid salts, the compound

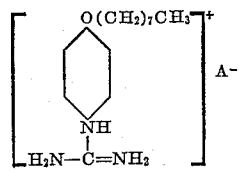

wherein A⁻ is the radical of an acid taken from the group consisting of carbonic, hydro-halogenic, nitric, sulfuric and tartaric acids.

3. As a reagent capable of quantitatively precipitating picric acid from aqueous solutions of picric acid and picric acid salts, the compound

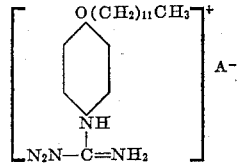

wherein A⁻ is the radical of an acid taken from the group consisting of carbonic, hydro-halogenic, nitric, sulfuric and tartaric acids.

4. As a reagent capable of quantitatively precipitating picric acid from aqueous solutions of picric acid and picric acid salts, the compound

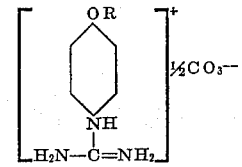

wherein R is an alkyl radical comprising at least five carbon atoms.

5. As a reagent capable of quantitatively precipitating picric acid from aqueous solutions of picric acid and picric acid salts, the compound

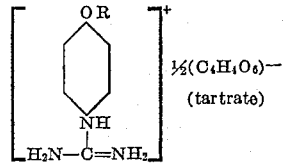

wherein R is an alkyl radical comprising at least five carbon atoms.

6. As a reagent capable of quantitatively precipitating picric acid from aqueous solutions of picric acid and picric acid salts, the compound

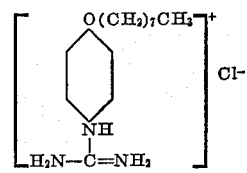

References Cited in the file of this patent

UNITED STATES PATENTS

| | | |
|---|---|---|
| 1,777,737 | Scott et al. | Oct. 7, 1930 |
| 1,950,067 | Sibley | Mar. 6, 1934 |
| 2,213,474 | Puetzer | Sept. 3, 1940 |
| 2,221,478 | Hill et al. | Nov. 12, 1940 |
| 2,697,651 | Gutzeit | Dec. 21, 1954 |
| 2,709,127 | Grosskopf | May 27, 1955 |

OTHER REFERENCES

Di Marco et al.: Chem. Abst. 46 (1952), 2125c.
Pasini: Chem. Abst. 48 (1954), 3048f; article published Il Farmaco, Ed. Sci. (Pavia) 8 (1953), 646–50.